United States Patent
Jokiel

(10) Patent No.: US 9,623,772 B2
(45) Date of Patent: Apr. 18, 2017

(54) METHOD FOR PRODUCING A VEHICLE SEAT FITTING

(75) Inventor: Christian Jokiel, Heiligenhaus (DE)

(73) Assignee: Keiper GMBH & Co. KG, Kaiserslautern (DE)

(*) Notice: Subject to any disclaimer, the term of this patent is extended or adjusted under 35 U.S.C. 154(b) by 150 days.

(21) Appl. No.: 14/344,131

(22) PCT Filed: Jul. 18, 2012

(86) PCT No.: PCT/EP2012/003029
§ 371 (c)(1),
(2), (4) Date: Mar. 11, 2014

(87) PCT Pub. No.: WO2013/037439
PCT Pub. Date: Mar. 21, 2013

(65) Prior Publication Data
US 2014/0354024 A1 Dec. 4, 2014

(30) Foreign Application Priority Data
Sep. 14, 2011 (DE) .......................... 10 2011 113 748

(51) Int. Cl.
*B23P 15/00* (2006.01)
*B60N 2/225* (2006.01)
(Continued)

(52) U.S. Cl.
CPC .............. *B60N 2/2252* (2013.01); *B21K 1/04* (2013.01); *B21K 21/12* (2013.01); *B21K 25/00* (2013.01);
(Continued)

(58) Field of Classification Search
CPC ........ B60N 2/2252; F16C 33/08; F16C 43/02; B23P 15/003; B23P 2700/50; B21K 21/12; B21K 1/04; B21K 25/00; Y10T 29/49668
See application file for complete search history.

(56) References Cited

U.S. PATENT DOCUMENTS 5,871,414 A 2/1999 Voss et al.
6,799,806 B2 10/2004 Eppert
(Continued)

FOREIGN PATENT DOCUMENTS

CN 1135953 A 11/1996
CN 1157784 A 8/1997
(Continued)

OTHER PUBLICATIONS

International Search Report dated Nov. 6, 2012; Application No. PCT/EP2012/003029.
(Continued)

*Primary Examiner* — Jacob Cigna
*Assistant Examiner* — Lee A Holly
(74) *Attorney, Agent, or Firm* — The Dobrusin Law Firm, P.C.

(57) ABSTRACT

In a method for producing a vehicle seat fitting, in which a plain bearing bush (28) is pressed in the axial direction into a receptacle of a first fitting part (11), wherein the pressed-in plain bearing bush (28) has a radially protruding securing region (28*b*), the securing region (28*b*) is formed before or after the pressing-in operation by material of the plain bearing bush (28) being displaced uncut, and the wall thickness (b) of the plain bearing bush (28) being less than 1.5 mm.

12 Claims, 7 Drawing Sheets

(51) Int. Cl.
*B60N 2/68* (2006.01)
*B21K 21/12* (2006.01)
*B21K 25/00* (2006.01)
*B21K 1/04* (2006.01)
*F16C 17/10* (2006.01)
*F16C 33/08* (2006.01)
*F16C 43/02* (2006.01)

(52) U.S. Cl.
CPC ............ *B23P 15/003* (2013.01); *B60N 2/682* (2013.01); *F16C 17/10* (2013.01); *F16C 33/08* (2013.01); *F16C 43/02* (2013.01); *B23P 2700/50* (2013.01); *Y10T 29/49668* (2015.01)

(56) References Cited

U.S. PATENT DOCUMENTS

2011/0271487 A1\* 11/2011 Schmidt .................. B21J 15/02
    16/380
2012/0277050 A1\* 11/2012 Jokiel ................. B60N 2/2254
    475/175

FOREIGN PATENT DOCUMENTS

| | | |
|---|---|---|
| DE | 19548809 C1 | 5/1977 |
| DE | 3515180 A1 | 2/1986 |
| DE | 4436101 A1 | 6/1995 |
| DE | 4411214 C2 | 10/1995 |
| DE | 19548809 C1 | 5/1997 |
| DE | 102007036537 A1 | 2/2008 |
| DE | 102007010078 B4 | 9/2008 |
| DE | 102009022767 B3 | 5/2010 |
| DE | 202009017811 U1 \* | 7/2010 ........... B60N 2/2252 |
| EP | 1852212 A2 | 11/2007 |
| GB | 2163687 A | 3/1986 |
| JP | 07-012136 | 1/1995 |
| JP | H0712136 A | 1/1995 |
| JP | 07-279947 | 10/1995 |
| JP | 09-079262 | 3/1997 |
| JP | 2005/127341 A | 5/2005 |
| JP | 2007-127228 | 5/2007 |
| WO | 2011/029520 A2 | 3/2011 |

OTHER PUBLICATIONS

Japanese Office Action for Japanese Application No. 2014-530107 dated Mar. 27, 2015.
Chinese Office Action for Chinese Application No. 201280044814.4, dated Jul. 1, 2015.
German Office Action for German Application No. 102011113748.7, dated Jun. 2, 2014.
Japanese Office Action for Japanese Application No. 2014-530107 dated Jan. 5, 2016.

\* cited by examiner

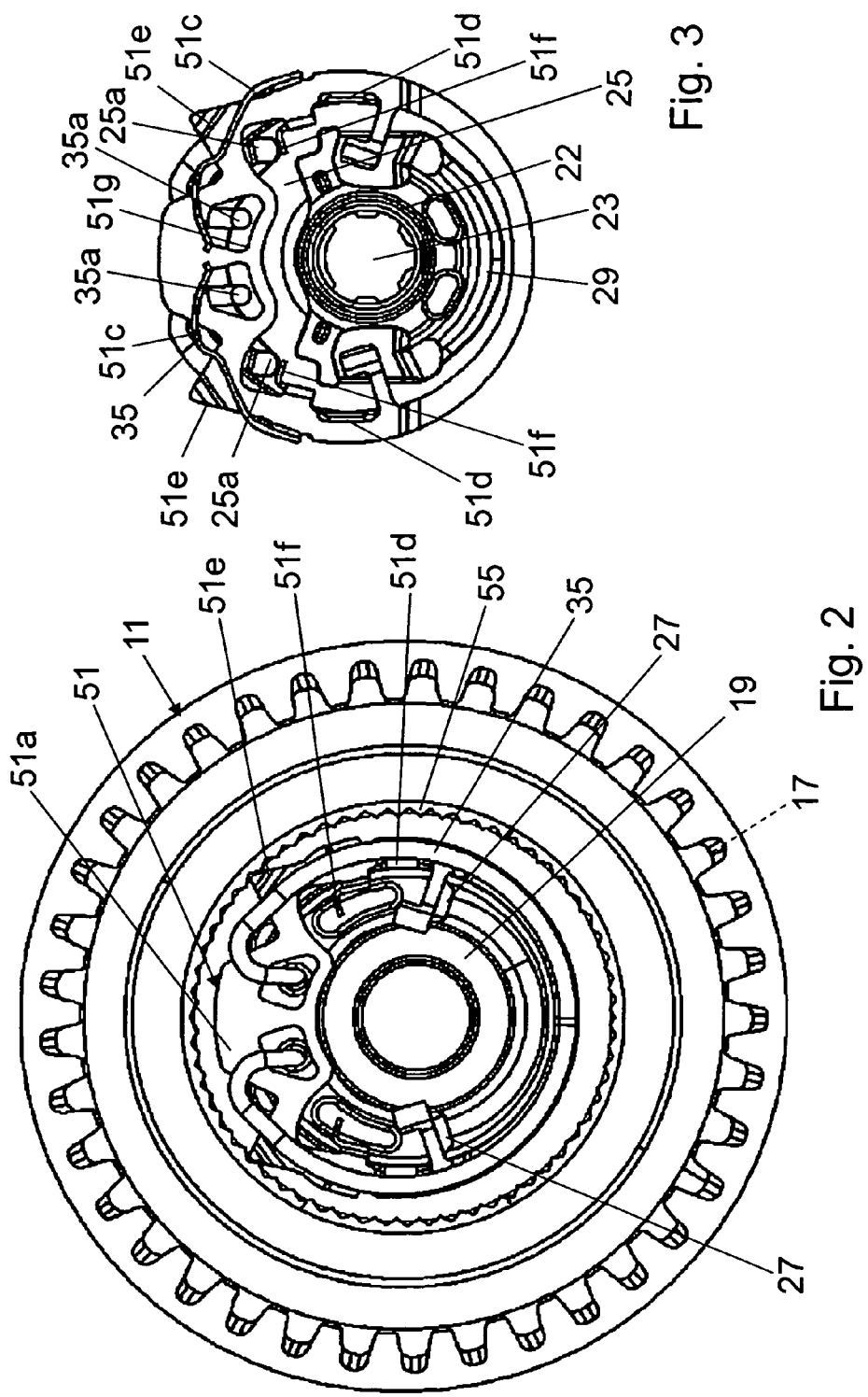

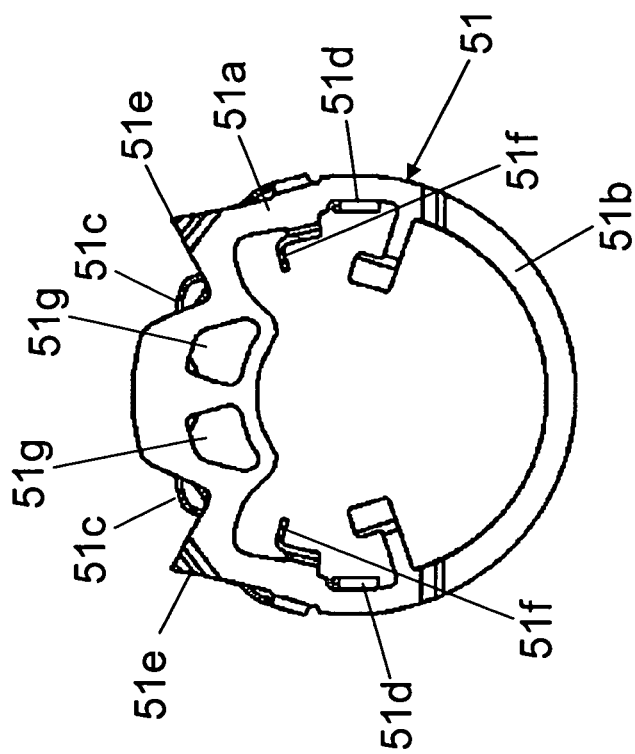
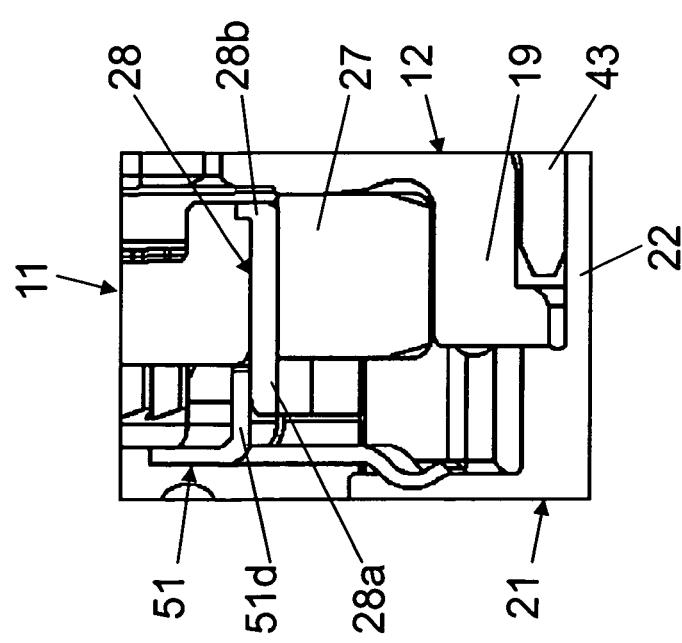

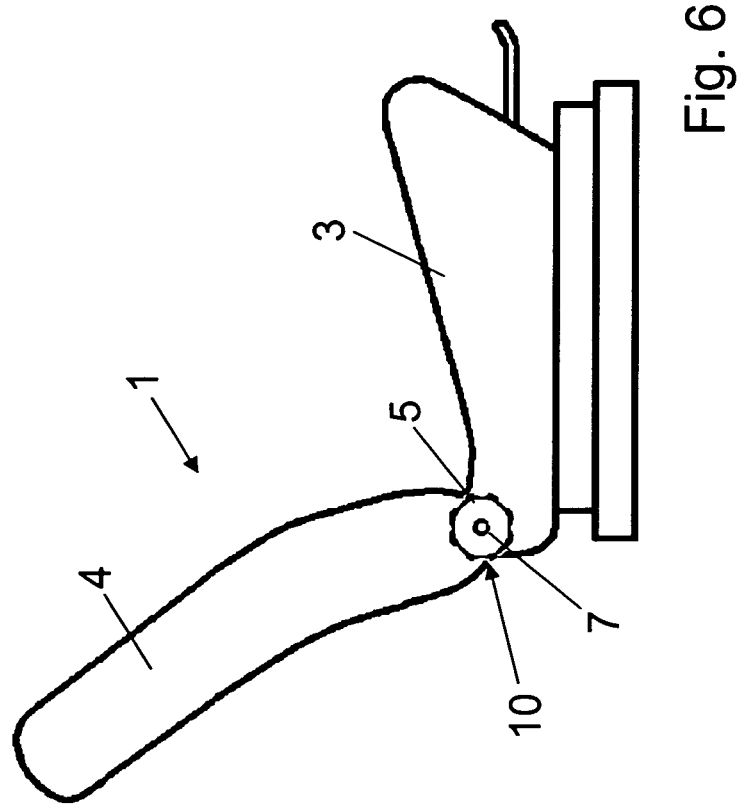

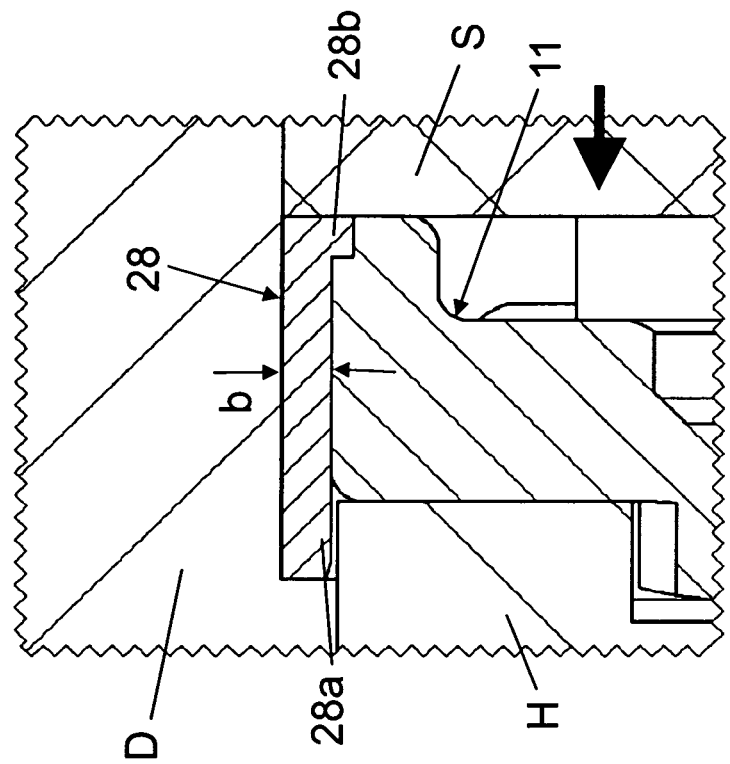
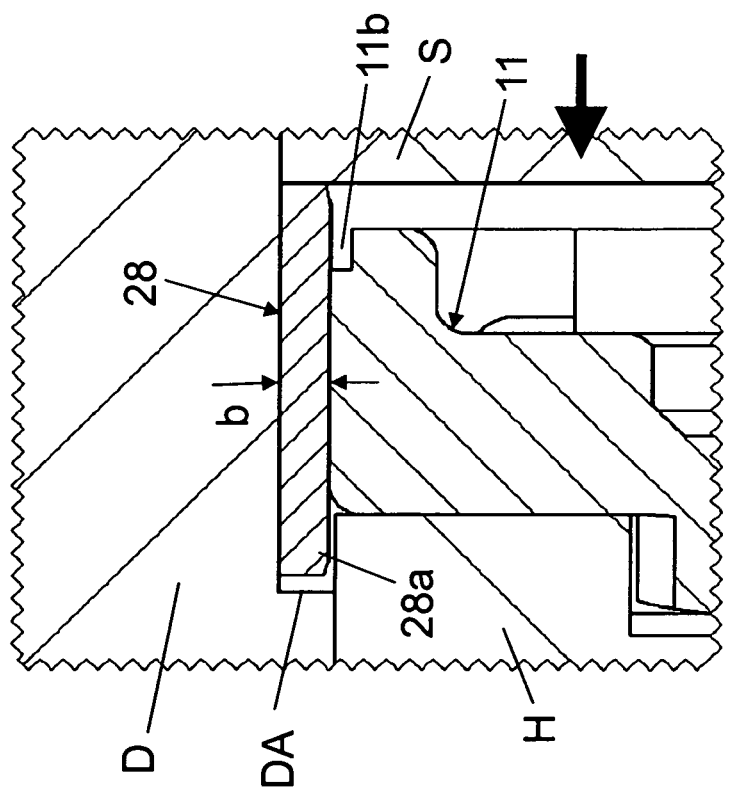

METHOD FOR PRODUCING A VEHICLE SEAT FITTING

CLAIM OF PRIORITY

This application is a national phase filing under 35 USC §371 from PCT Application serial number PCT/EP2012/003029 filed on 18 Jul. 2012, and claims priority therefrom. This application further claims priority from DE 10 2011 113 748.7 filed 14 Sep. 2011 both incorporated herein by reference for all purposed in their entirety.

The invention relates to a method for producing a vehicle seat fitting, wherein a plain bearing bush is pressed in an axial direction into a receiving member of a first fitting member, wherein the pressed-in plain bearing bush has a radially protruding securing region.

DE 44 11 214 C2 discloses how the plain bearing bush is introduced into the receiving member of the first fitting member. To this end, in a first step, the first fitting member is secured in a retention member of a tool and the plain bearing bush is placed on a mandrel of the tool. In a second step, by means of a relative movement of the mandrel and retention member, the plain bearing bush is pressed into the receiving member of the first fitting member. The outer dimensions of the plain bearing bush are selected, in the context of press-fitting, to be slightly larger than the inner dimensions of the receiving member of the first fitting member so that material which has accumulated at the trailing end of the plain bearing bush—with respect to the movement of the mandrel—is displaced and acts as an axial securing means.

An object of the invention is to improve a method of producing a vehicle seat fitting, wherein a plain bearing bush is pressed in an axial direction into a receiving member of a first fitting member, and wherein the pressed-in plain bearing bush has a radially protruding securing region. This object is achieved according to the invention by a fitting, wherein the securing re ion is formed before or after the pressing-in operation by material of the plain bearing bush being displaced in a non-cutting manner and that the wall thickness of the plain bearing bush is less than 1.5 mm. The description and claims herein relate to advantageous embodiments.

The construction of a securing region of the plain bearing bush which acts as an axial securing means counter to displacement of the plain bearing bash in an axial direction (away from the second fitting member), wherein the securing region is formed before or after the pressing-in operation, has the advantage that such axial securing does not have to be provided by the pressing-in operation, that is to say, becomes more tolerance-independent. Occurrences of radial overlapping of the slightly larger plain bearing bush and the slightly smaller receiving member of the first fitting member can be kept small. This reduces the expenditure of force during pressing in.

The wall thickness of the plain bearing bush, that is to say, the half of the difference between the outer diameter and the inner diameter, is less than 1.5 mm, in particular between 0.3 and 1.2 mm, preferably between 0.8 and 1.1 mm, in a particularly preferred manner 1.0±0.05 mm.

The construction of the securing region and any material displacement when the plain bearing bush is pressed in are carried out in a non-cutting manner by means of obtuse compression of the material of the plain bearing bush, that is to say, substantially of the edge layer of the rear facing away from the sliding layer and one of the ends of the plain bearing bush. In this instance, the construction of the securing region and the material displacement is preferably carried out in a non-cutting manner. The obtuse compression is thereby particularly suitable for small wall thicknesses of the plain bearing bosh which could be impaired in terms of its function as a result of cutting methods as described, for example, in DE 10 2009 022 767 B3 both for the pressing-in operation and for the formation of the securing region.

The formation of the securing region is preferably carried out at the trailing end during the pressing-in operation. The material of this trailing end of the plain bearing bush is then displaced radially outward, for example, into an annular recess having a rectangular or triangular profile. The plain bearing bush is pressed into the first fitting member in a rotationally secure manner.

The construction of the toothed ring on the first fitting member which receives the eccentric member and the construction of the toothed wheel on the second fitting member which supports the eccentric member save material and structural space by the toothed wheel being able to be formed on the radially outer edge of the second fitting member (which then preferably engages over a clamping ring which is secured to the first fitting member) and nonetheless sufficiently large connection regions being provided on the second fitting member for assembly of the fitting. The toothed wheel on the radially outer edge of the second fitting member is then preferably overlapped by a clamping ring which is secured to the first fitting member. The substantially planar form of the clamping ring requires less material compared with the known construction which has an L-shaped profile, which leads to a saving in terms of weight and costs.

The construction of the tooth arrangement—which is separate with respect to the toothed ring—on the first fitting member which receives the eccentric member enables adoption of the concept of locking the eccentric member in the non-driven state of the fitting, as known from DE 195 48 S09 C1. Without the locking element disclosed therein, under dynamic operating conditions, that is to say, during travel, movements of the wedge segments would occur as a result of shaking and impacts, which in turn could lead to a relative movement of the fitting members, the so-called "runoff". The locking element prevents the runoff, on the one hand, by retaining the wedge segments by means of the edges of openings which are formed therein and by means of end fingers of a spring which acts on the wedge segments and, on the other hand, by cooperating with one of the fitting members by means of catch projections which are formed thereon.

When the toothed ring is stamped, there is produced on the reverse side thereof an outwardly facing counter-tooth arrangement. The construction of the tooth arrangement separate from the toothed ring enables a structural space-saving adaptation of the geometries of the locking element and tooth arrangement.

The locking element preferably has an annular shape, for example, comprising two arcs, and preferably rests on a projection of the plain bearing bush, by means of which the first fitting member receives the eccentric member. Corresponding resilient arms ensure a non-positive-locking connection. Optionally, there may be provided guiding portions which improve the support on the projection. A single-piece construction of spring steel enables simple integration of the features of the locking element. For cooperation with the tooth arrangement of the first fitting member, which is preferably constructed as a toothed ring with radially inwardly directed teeth, there are preferably provided locking projections which are directed radially outward. In order to cooperate with the eccentric member, there are preferably provided openings, through which the spring of the eccentric member which preferably comprises two wedge segments extends. For cooperation with the carrier there are preferably provided support fingers which the carrier can act on by means of stops.

Compared with solutions in which the locking element cooperates with tooth arrangements on the plain bearing bush (DE 10 2007 010 078 B4) or on a collar of the receiving member which is lined by the plain bearing bush, there is in this instance the advantage that a larger radius of the tooth arrangement defines a larger lever arm for the locking torque.

The locking element primarily serves to lock the fitting under dynamic loads. The basic proportion during rocking is applied by the friction between the eccentric member and one of the two fitting members, preferably the second fitting member, which preferably has a collar for supporting the eccentric member. The wedge segments which are preferably provided and which define the eccentric member serve both to lock and to drive the rolling movement of the toothed wheel and toothed ring.

The use of an eccentric planetary gear enables stepless inclination adjustment of the backrest. The saving of a central pinion with respect to a planetary gear leads to the occurrence of a wobbling movement, which is superimposed on the relative rotation of the fitting members. The eccentric planetary gear may be driven manually or in a motorized manner.

The invention is explained in greater detail below with reference to an embodiment illustrated in the drawings, in which:

FIG. 2 is a part-view of the fitting without a carrier,

Figure 1:
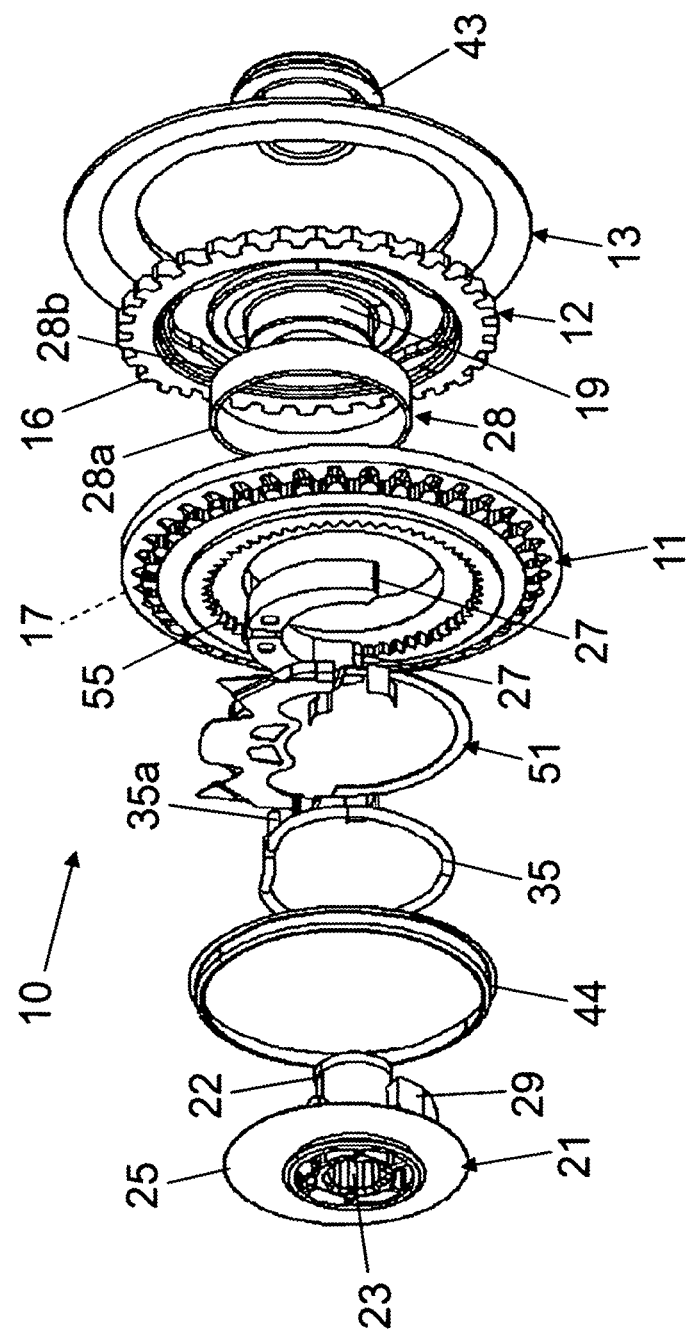
FIG. 1 is an exploded view of the fitting.
Figure 7:
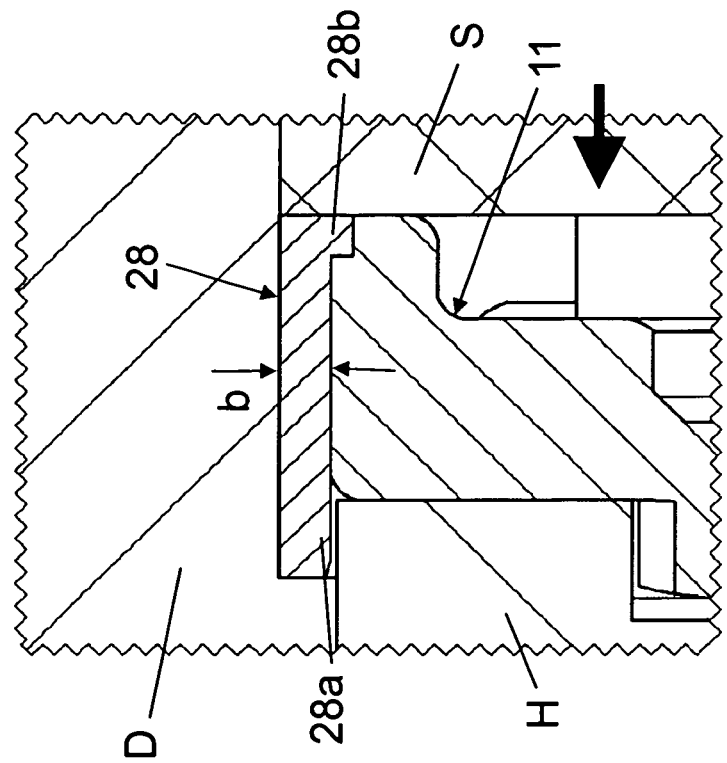
Figure 8:
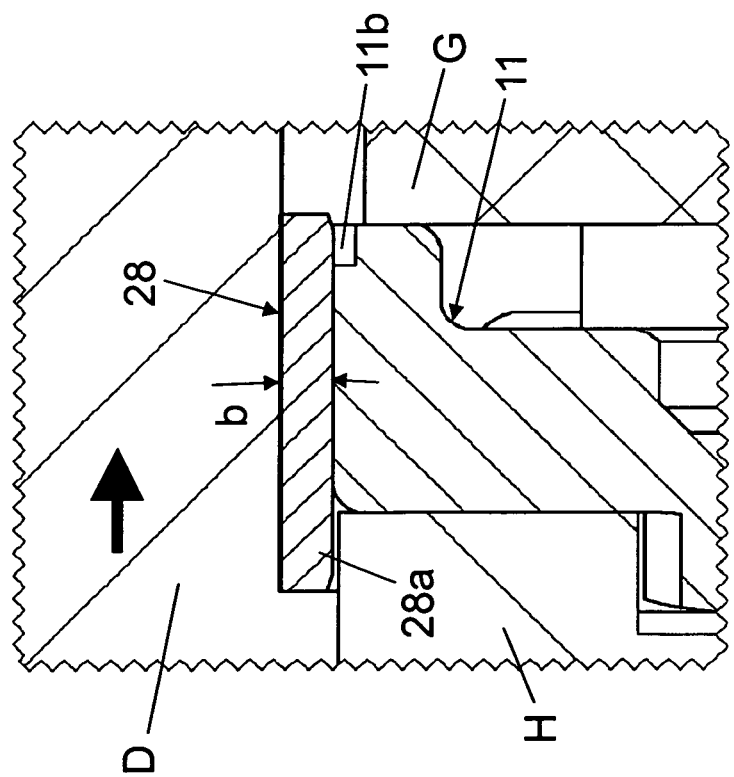
Figure 11:
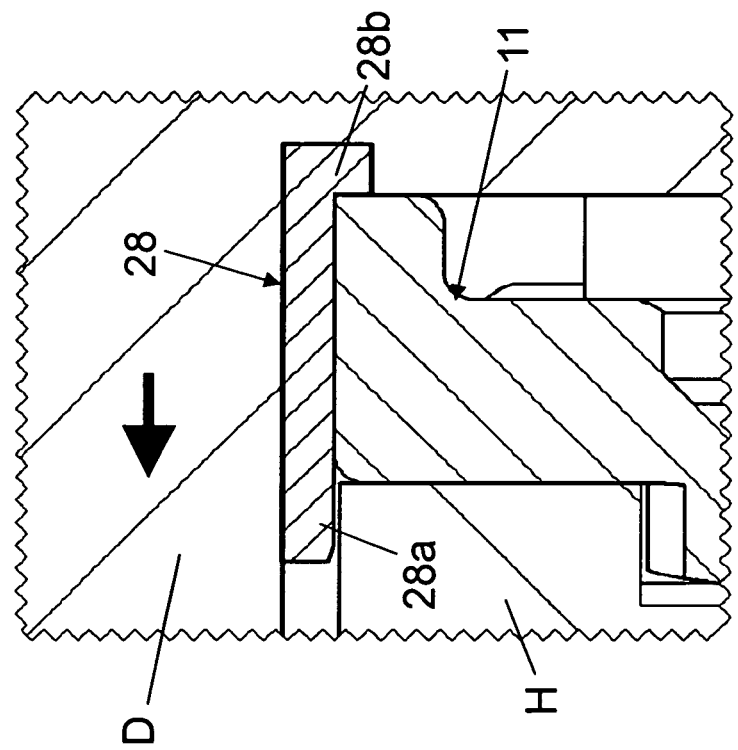
Figure 12:
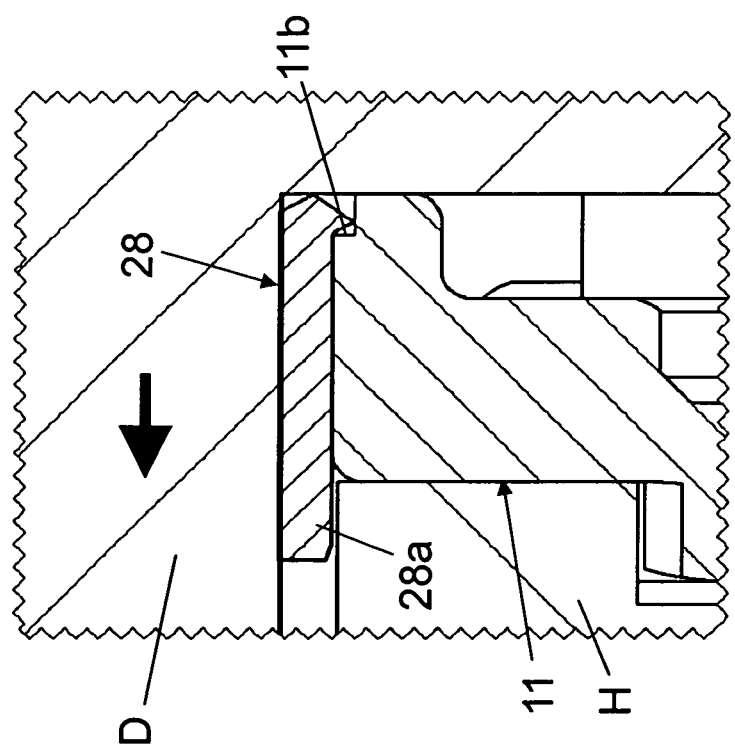

FIG. 3 is a view of the carrier, spring and locking element, from the opposite direction to FIG. 2, FIG. 4 is a part-section through the fitting, FIG. 5 is a view of the locking element, FIG. 6 is a schematic view of a vehicle seat, FIG. 7 is a part-section having a pressed-in plain bearing bush before the construction of the securing region thereof at the leading edge, FIG. 8 is the part-section of FIG. 7 after the construction of the securing region which is arranged in a recess of the first fitting member, FIG. 9 is a part-section during the pressing-in of the plain bearing bush before the construction of the securing region thereof at the trailing edge, FIG. 10 is the part-section of FIG. 9 after the construction of the securing region which is arranged in a recess of the first fitting member, FIG. 11 is a part-section having a plain bearing bush whose securing region is preformed, and FIG. 12 is a part-section having a plain bearing bush whose securing region rests on an end face of the first fitting member.

A vehicle seat 1 for a motor vehicle has a seat member 3 and a backrest 4 which can be adjusted in terms of the inclination thereof relative to the seat member 3. In order to adjust the inclination of the backrest 4, there is rotated, manually, for example, by means of a hand wheel 5, or in a motorized manner, for example, by means of an electric motor, a drive shaft 7 which is arranged horizontally in the transition region between the seat member 3 and the backrest 4. At both sides of the vehicle seat 1, the drive shaft 7 engages in a rotationally secure manner in a fitting 10. The drive shaft 7 defines the direction indications used of a cylindrical coordinate system.

The fitting 10 has a first fitting member 11 and a second fitting member 12 which can be rotated relative to each other. The two fitting members 11 and 12 can each be inscribed substantially in a circular disk form. In order to receive the axially acting forces, that is to say, to hold together the fitting members 11 and 12, a clamping ring 13 is provided. Such retention by means of a clamping ring is described, for example, in U.S. Pat. No. 6,799,806 A. The preferably metal clamping ring 13 is securely connected to one of the two fitting members 11 and 12, in this instance to the first fitting member 11 in an outer edge portion, for example, welded or flanged. By means of a radially inwardly directed edge, the clamping ring 13, optionally with a separate sliding ring being interposed, engages in a radially outward direction over the other of the two fitting members 11 and 12 which can be moved, relative to it, without impeding the relative movement of the two fitting members 11 and 12. In structural terms, the two fitting members 11 and 12 therefore form together (with the clamping ring 13) a disk-like unit.

With the assembly of the fitting 10, the first fitting member 11 is, for example, securely connected to the structure of the backrest 4, that is to say, is secured to the backrest member. The second fitting member 12 is then securely connected to the structure of the seat member 3, that is to say, is secured to the seat member. However, the associations of the fitting members 11 and 12 may also be transposed, that is to say, the first fitting member 11 would then be secured to the seat member and the second fitting member 12 would be secured to the backrest. The fitting 10 is therefore located in the force path between the backrest 4 and seat member 3, for which reason the two fitting members 11 and 12 comprise metal, preferably steel.

The fitting 10 is constructed as a gear fitting, in which the first fitting member 11 and the second fitting member 12 are connected to each other by means of a gear for adjustment and securing, more precisely by means of an—in this instance self-locking—eccentric planetary gear, as described, for example, in DE 44 36 101 A1.

In order to construct the gear, there is formed on the second fitting member 12 an externally-toothed toothed wheel 16 and on the first fitting member 11 an internally-toothed toothed wheel 17 which mesh with each other. The diameter of the addendum circle of the outer tooth arrangement of the toothed wheel 16 is at least one tooth height smaller than the diameter of the roof circle of the inner tooth arrangement of the toothed ring 17. A corresponding difference in the number of teeth of the toothed wheel 16 and toothed ring 17 of at least one tooth enables a rolling movement of the toothed ring 17 on the toothed wheel 16. The construction of the toothed wheel 16 and the toothed ring 17 is preferably carried out by means of a single embossing/stamping operation, which at the same time punches the fitting members 11 and 12 from the starting material thereof. In this instance, the toothed wheel 16 forms the radially outer edge of the second fitting member 12, that is to say, the second fitting member 12 in the radially outward direction terminates with the toothed wheel 16.

One of the two fitting members 11 and 12 has a collar 19, in this instance the second fitting member 12, concentric with the toothed wheel 16. The collar 19 may be formed as an extruded collar on said fitting member (that is to say, constructed integrally) or be secured thereto as a separate sleeve. In the collar 19, a carrier 21 is rotatably supported by means of a hub 22. The carrier 21 preferably comprises plastics material. The hub 22 of the carrier 21 is provided centrally with a hole 23 for receiving the drive shaft 7. The profile of the hole 23 is constructed so as to correspond to the profile of the drive shaft 7, in this instance a wedge shaft profile. Adjacent to the hub 22 thereof, the carrier 21 has a covering plate 25 which is constructed integrally with the hub 22 and which has a larger diameter than the hub 22.

On the collar 19 there are supported with the curved inner faces thereof two wedge segments 27 which, with the curved outer faces thereof, bear the other of the two fitting members 11 and 12, in this instance the first fitting member 11. To this end, a receiving member of the latter fitting member is provided with a plain bearing bush 28 which is preferably pressed-in in a rotationally secure manner and with which the outer faces of the wedge segments 27 are in abutment. The terms "support" and "bear" are not intended to be limited to a specific direction of the force path through the fitting 10 since this direction is dependent on the assembly of the fitting 10.

The carrier 21 has—with radial spacing from the hub 22—a carrier segment 29 which grips with play between the narrow sides of the wedge segments 27 and which is constructed integrally with the covering plate 25 and the hub 22. The wedge segments 27, whose wide sides face each other, receive, for example, with a recess which is defined in each case by protruding material portions, an angled end finger 35a of an omega-shaped spring 35. The spring 35 acts on the wedge segments 27 in a peripheral direction, in particular in order to press them apart, the wide sides of the wedge segments 27 being able to touch each other and act on each other during operation.

The carrier 21 is axially secured at the outer side of the fitting member having the collar 19 by means of a preferably clipped-on securing ring 43. At the outer side of the fitting member (in this instance, the first fitting member 11) having the sliding bearing bush 28, there is provided between the radially outer edge thereof and the covering plate 25 a sealing ring 44 which is, for example, of rubber or soft plastics material and which is connected, in particular clip-fitted, to the covering plate 25.

As a result of the wedge segments 27 (and the spring 35), there is defined an eccentric member which, in continuation of the direction of the eccentricity, presses the toothed wheel 16 at an engagement location into the toothed ring 17. In the case of a driving action by the drive shaft 7 which rotates (multiple times), a torque is transmitted first to the carrier 21 and then by means of the carrier segment 29 to the eccentric member which is defined in this manner and which slides along the plain bearing bush 28 so as to displace the direction of the eccentricity and consequently to displace the engagement location of the toothed wheel 16 in the toothed ring 17, which becomes evident as a wobbling rolling movement, that is to say, as a relative rotation with superimposed wobbling movement. The inclination of the backrest 4 can thereby be adjusted in a stepless manner between a plurality of positions for use.

In order to improve the dynamic operating behavior, there is further provided as a locking element a locking spring 51, as disclosed, for example, in DE 195 48 809 C1. The locking spring 51 is in this instance constructed integrally from spring steel.

The substantially annular locking spring 51 has a curved base member 51a which is arranged in a plane parallel with the first fitting member 11 and a curved bearing member 51b which is arranged in a plane offset with respect to the curved base member 51a and which adjoins the curved base member 51a at both sides in each case by means of a bent portion so as to form the annular shape. Two resilient arms 51c face each other with the free ends thereof and are formed with the ends facing away from each other on the curved base member 51a. While the carved base member 51a and the carved bearing member 51b are largely located within said two planes in a peripheral and in a radial direction, the two resilient arms 51c extend in an axial direction between the said two planes. There optionally project from the curved base member 51a two bent, cylindrically curved guiding portions 51d which also extend in an axial direction between said two planes. Finally, the locking spring 51 further has two locking projections 51e which protrude from the curved base member 51a radially (outward), two support fingers 51f which protrude axially from the curved base member 51a (or alternatively from the curved bearing member 51b), and two openings 51g which are formed in the curved base member 51a.

The plain bearing bush 28 preferably has a steel or bronze rear, which carries a sliding layer at the radially inner side, for example, PTFE rolled in a tin/lead/bronze (sintered). The plain bearing bush 28 is produced as a strip and roiled to form a ring, the ends of the strip, for example, being butt-welded or alternatively being connected to each other in a positive-locking manner by means of a clinch connection or dovetail connection or alternatively merely being in abutment with each other. Before the pressing-in operation into the receiving member of the first fitting member 11, the axial dimension in this instance is 7.7±0.2 mm, the outer diameter 33.0±0.05 mm and the inner diameter 31.0±0.05 mm, that is to say, the wall thickness b is 1.0±0.05 mm. At the end faces there is provided in each case at the radially outer side a chamfer having an angle of 20°±5° with respect to the axial direction and at the radially inner side an edge having a tolerance of −0.1 to 0.4 mm. The axial dimension of the chamfer is 0.6±0.2 mm so that a wall thickness b of at least 0.3 mm is produced.

In this instance, the sliding hearing bush 28 has a larger axial dimension than the receiving member which is lined by it so that it protrudes in an axial direction over the fitting member associated therewith, that is to say, in this instance the first fitting member 11, which defines a projection 28a. The locking spring 51 is supported on the projection 28a of the plain bearing bush 28 by, on the one hand, the curved bearing member 51b and, if present, the guiding portions 51d being in abutment with the projection 28a of the plain bearing bush 28 and, on the other hand, at the side radially opposite the curved bearing member 51b, the resilient arms 51c being tensioned against the projection 28a of the plain bearing bush 28. The end fingers 35a of the spring 35 extend through the openings 51g.

The locking spring 51 cooperates with a tooth arrangement 55 which is concentric with respect to the plain bearing bush 28 and which is arranged radially at the outer side of the bush 28 on the first fitting member 11 and whose teeth are directed radially inward, that is to say, which is constructed as an additional toothed ring, in this instance at the rear side of the toothed ring 17 and concentrically relative thereto. The looking spring 51 locks the wedge segments 27 in the non-driven state of the fitting 10 by the locking projections being in engagement with the tooth arrangement 55. A movement of the wedge segments 27 is prevented by means of an abutment of the end fingers 35a of the spring 35 against the edges of the respective openings 51g. Since the openings 51g are greater than the cross-section of the end fingers 35a, the abutment is carried out only after a slight movement of at least one of the wedge segments 27, which movement is dependent on the tolerances, that is to say, after a slight rotation of the eccentric member.

The locking spring 51 is released by the driven carrier 21 by moving into abutment with one of the support fingers 51f by means of a control cam 25a which is preferably formed on the covering plate 25, a control cam 25a and a support finger 51f being provided for each rotation direction, respectively. When the carrier 21 acts on the support finger 51f, it begins to pull the locking projections 51e out of the tooth arrangement 55, in a radially inward direction. The locking spring 51 which is rotatably supported on the plain bearing bush 28 then rotates with the carrier 21. The edges of the openings 51g facing away from each other extend in an oblique manner with respect to the radial direction. As soon as the end finger 35a which is arranged in a trailing manner reaches the oblique edge of the associated opening 51g, which edge is arranged in a trailing manner, the region of the locking spring 51 having the locking projections 51e, that is to say, the curved base member 51a, moves further radially inward. The locking projections 51e and the tooth arrangement 55 then move completely out of engagement. At the same time or afterward, the carrier segment 29 moves into abutment with the trailing one of the two wedge segments 27, whereupon the eccentric member begins to rotate (revolve). If the carrier 21 is stopped, the resilient arms 51c bring the locking projections 51e into engagement again with the tooth arrangement 55 so that the wedge segments 27 are locked again.

The plain bearing bush 28 has, at the end remote from the projection 28a, a radially protruding securing region 28b which acts as axial securing against displacement of the plain bearing bush 28 in an axial direction away from the second fitting member 12. In an axial direction toward the second fitting member 12, the member acts as axial securing against a displacement of the plain bearing bush 28. In order to introduce the plain bearing bush 28 into the receiving member of the first fitting member 11, in a first step the first fitting member 11 is placed on a retention member H of a tool and precentered and the plain bearing bush 28 is placed on a mandrel D of the tool. In a second step, as a result of a relative movement of the mandrel D and the retention member H (which receives the first fitting member 11), the plain bearing bush 28 is pressed into the receiving member of the first fitting member. The outer dimension of the plain bearing bush 28 is in the context of a press-fit selected to be identical or preferably (for tolerance compensation) slightly larger than the inner dimension of the receiving member of the first fitting member 11 so that this press-fit supports the axial securing. The material of the first fitting member 11, as a result of a previously carried out hardening operation, is preferably harder than the material of the plain bearing bush 28. Any excess material which, owing to the differences in the dimension is displaced during pressing-in, accumulates on the—with respect to the movement of the mandrel D—trailing end of the plain bearing bush 28.

The displacement of the material of the plain bearing bush 28 when if is pressed into the receiving member of the first fitting member 11 is carried out in a non-cutting manner by means of obtuse crushing of the material of the plain bearing bush 28. This differs from an abrasion operation, that is to say, a chip-forming cutting operation, as disclosed, for example, in DE 10 2009 022 767 B3. While the latter method, as a result of chip formation, can be used only with sufficiently great wall thicknesses b of the plain bearing bush 28, it is possible with the present method also to press in plain bearing bushes 28 with smaller wall thicknesses b, in particular between 0.3 and 1.1 mm, preferably in a non-cutting manner.

There are a number of possibilities for producing the securing region 28b. The securing region 28b produced can be arranged in an annular recess 11b of the first fitting member 11 around the receiving member for the plain bearing bush 28 (FIGS. 8, 10, 11) or it may rest on the end face of the first fitting member 11 (FIG. 12), that is to say, protrude axially. The annular recess 11b may have a rectangular profile (FIGS. 7 to 9) or a triangular (V-shaped) profile. In the latter case, the annular recess 11b is a chamfer at the end of the receiving member for the plain bearing bush 28.

The securing region 28b may be formed at the leading end of the plain bearing bush 28 with respect to the movement of the plain bearing bush 28. To this end, the first fitting member 11 is clamped in the first step mentioned above between the retention member H and a counter-retention member G. In the second step mentioned above, the plain bearing bush 28 is pressed so far in that another projection is produced (FIG. 7) at the trailing end of the projection 28a and at the leading end. The material of this additional projection is then shaped in a third step by being displaced radially outward, for example, by means of a stamp S, which is provided, in place of the counter-retention member G and is moved relative to the mandrel D, while the retention member H and the mandrel D remain unmoved relative to each other. As a result of the shaping, the securing region 28b is produced (FIG. 8). The method which is used in this instance and which is based on obtuse crushing has, compared with a shaping operation by means of a knife-edged ring or another cutting element on the stamp S, the advantage that less tool wear occurs.

Alternatively, the securing region 28b can be formed at the trailing end of the plain bearing bash 28 with respect to the movement of the plain bearing bush 28. In this instance, two variants are possible. In one variant (FIGS. 9, 10), the securing region 28b is constructed afterward. In the above-mentioned second step (FIG. 9), the plain bearing bush 28 which is arranged on the resting mandrel D is pressed in by means of a stamp S to such an extent that, at the leading end, it moves into abutment with a stop DA on the mandrel D with the projection 28a thereof and another projection is produced at the trailing end. The material of this additional projection is then shaped in a third step (which seamlessly follows the second step) by being displaced radially outward, in this instance by means of the stamp S or alternatively by means of a blow, wobble riveting or the like, so that the securing region 28b is produced by means of obtuse crushing (FIG. 10). The different steps described may also be combined to form one or more steps.

In the other variant (FIGS. 11, 12), the securing region 28b is already preformed before the pressing-in operation on the plain bearing bush 28 (FIG. 11) or completely constructed (FIG. 12). With respect to the retention member H, the mandrel D moves in the opposite direction to that in FIG. 7. If the securing region 28b is only preformed before the pressing-in action, in the second step the plain bearing bush 28 is pressed in until, at the leading end, the projection 28a and another projection at the trailing end are produced (FIG. 11), at least with respect to the annular recess 11b. In the third step, the material of the preformed securing region 28b is shaped, for example, by means of a stamp, until it is completely finished, that is to say, protrudes radially in the manner of a collar. This shaping can be carried out, for example, by the retention member H supporting the plain bearing bush 28 and the mandrel D continuing to move. In this instance, the mandrel D has a shaping contour which brings about the obtuse crushing of the preformed securing region 28b. The shaping may also be carried out, for example, by means of a separate stamp. The annular recess 11b may act as a counter-stamp. If the securing region 28b is already completely formed before the pressing-in operation, for example, as a (radially protruding) collar, in the second step the plain bearing bush 28 is pressed in until the projection 28a is produced at the leading end and the securing region 28b reaches its end position at the trailing end, that is to say, comes to rest in the annular recess 11b (end position of the plain bearing bush 28 as in FIG. 10) or rests on the end face of the first fitting member 11 (FIG. 12).

LIST OF REFERENCE NUMERALS

1 Vehicle seat
3 Seat member
4 Backrest
5 Hand wheel
7 Drive shaft
10 Fitting
11 First fitting member
11b Annular recess
12 Second fitting member
13 Clamping ring
16 Toothed wheel
17 Toothed ring
19 Collar
21 Carrier
22 Hub
23 Hole
25 Covering plate
25a Control cam
27 Wedge segment
28 Plain bearing bush
28a Projection
28b Securing region
29 Carrier segment
35 Spring
35a End finger
43 Securing ring
44 Sealing ring
51 Locking spring, locking element
51a Curved base member
51b Curved bearing member
51c Resilient arm
51d Guiding portion
51e Locking projection
51f Support finger
51g Opening
55 Tooth arrangement
b Wall thickness
D Mandrel
DA Stop
G Counter-retention member
H Retention member
S Stamp

The invention claimed is:

1. A method for producing a vehicle seat fitting wherein a plain bearing bush is pressed in an axial direction into a receiving member of a first fitting member wherein the pressed-in plain bearing bush has a radially protruding securing region wherein the securing region is formed before or after the pressing-in operation by material of the plain bearing bush being displaced in a non-cutting manner, and a wall thickness of the plain bearing bush is less than 1.5 mm,
wherein a construction of the securing region and any material displacement when the plain bearing bush is pressed in is carried out in a non-cutting manner by means of obtuse compression of the material of the plain bearing bush,
wherein the material of the securing region is shaped by means of a stamp until it protrudes radially in manner of a collar,
wherein shaping of the material of the securing region is carried out by a retention member supporting the plain bearing bush and a mandrel continuing to move,
wherein the mandrel has a shaping contour which brings about the obtuse compression of the securing region,
wherein the plain bearing bush is pressed into the first fitting member in a rotationally secure manner,
wherein the plain bearing bush has a steel or bronze rear, which carries a sliding layer at a radially inner side, and
wherein the sliding layer comprises polytetrafluoroethylene (PTFE) sintered in tin and/or lead and/or bronze.

2. The method of claim 1, wherein the securing region is formed at a leading edge during the pressing-in operation by material of the plain bearing bush being displaced radially outward after the pressing-in operation.

3. The method of claim 1, wherein the securing region is completely formed at a trailing end during the pressing-in operation by material of the plain bearing bush being displaced radially outward after the pressing-in operation.

4. The method of claim 3, wherein the securing region is preformed before the plain bearing bush is pressed in, or the securing region is completely formed before the plain bearing bush is pressed in at the trailing end during the pressing-in operation.

5. The method of claim 1, wherein, after the pressing-in of the plain bearing bush, the securing region is arranged in a recess of the first fitting member or rests on an end face of the first fitting member.

6. The method of claim 1, wherein, when the securing region is formed, the material of the plain bearing bush is displaced into an annular recess of the first fitting member, and wherein the annular recess has a profile that is rectangular or triangular.

7. The method of claim 1, wherein the wall thickness of the plain bearing bush is between 0.3 and 1.2 mm.

8. The method of claim 1, wherein an axial projection is formed at an end of the plain bearing bush facing away from the securing region after the pressing-in operation.

9. The method of claim 1, wherein the pressed-in plain bearing bush receives an eccentric member which is supported on a second fitting member which is connected in a geared manner to the first fitting member by means of a toothed wheel and a toothed ring which mesh with each other, and which, in a state driven by a carrier rotatably drives a relative rolling movement of the toothed wheel and toothed ring, wherein there is provided a locking element which locks the eccentric member in a non-driven state of the fitting by means of cooperation with a tooth arrangement which is formed on the first fitting member and which releases the eccentric member when driven by the carrier, wherein the locking element is supported on an axial projection of the plain bearing bush.

10. The method of claim 1, wherein the wall thickness of the plain bearing bush is between 0.8 and 1.1 mm.

11. The method of claim 3, wherein the securing region is preformed before the plain bearing bush is pressed in.

12. The method of claim 3, wherein the securing region is completely formed before the plain bearing bush is pressed in at the trailing end during the pressing-in operation.

* * * * *